(No Model.)
C. G. SHEPARD & P. ADAMS, Jr.
BLIND HINGE.
No. 282,470. Patented July 31, 1883.
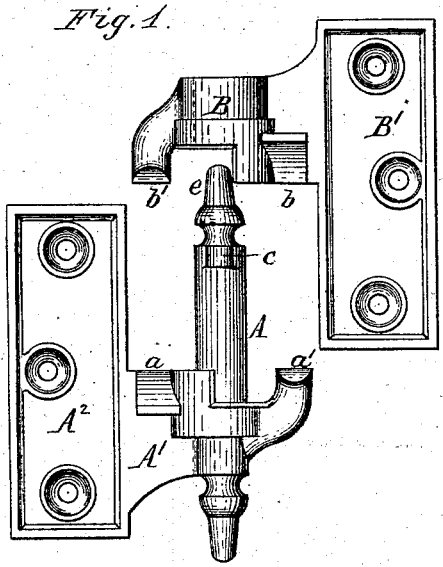
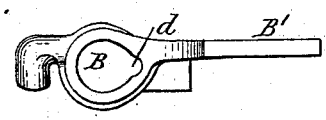

UNITED STATES PATENT OFFICE.

CHARLES G. SHEPARD AND PETER ADAMS, JR., OF BUFFALO, NEW YORK; SAID ADAMS ASSIGNOR TO WALTER J. SHEPARD, OF SAME PLACE.

BLIND-HINGE.

SPECIFICATION forming part of Letters Patent No. 282,470, dated July 31, 1883.

Application filed June 16, 1883. (No model.)

*To all whom it may concern:*

Be it known that we, CHARLES G. SHEPARD and PETER ADAMS, Jr., both of the city of Buffalo, in the county of Erie and State of New York, have invented a new and useful Improvement in Blind-Hinges, of which the following is a specification.

This invention relates to an improvement in that class of hinges in which the pintle is provided with a projection or lip whereby the eye portion of the hinge is prevented from separating from the pintle portion, except when a recess formed in the eye is brought in line with the lip on the pintle.

In this class of hinges, in which the pintle portions are secured to the building, it is a matter of some difficulty, in hanging a blind, to bring both eye portions, which are secured to the same blind, in the proper position for passing their recesses over the stops on both pintles.

The object of our invention is to overcome this difficulty and facilitate the operation of hanging the blind; and our invention consists in providing the pintle above the stop or lip with a tapering extension which forms a temporary seat for the eye and supports the blind while it is being turned for the purpose of bringing the recesses of the eyes in line with the stops on the pintles.

In the accompanying drawings, Figure 1 is an elevation of a blind-hinge provided with our improvement. Fig. 2 is an elevation of the upper portion of the pintle at right angles to Fig. 1. Fig. 3 is a top plan view of the eye portion.

Like letters of reference refer to like parts in the several figures.

A represents the pintle, A' the base or knuckle provided with locking-inclines $a\ a'$, and $A^2$ the leaf of the pintle portion.

B represents the eye, $b\ b'$ the locking-inclines formed on the same, and B' the leaf of the eye portion.

$c$ represents the projecting stop or lip, formed on the pintle at such a distance from the knuckle A' that the eye B can play vertically on the pintle between the knuckle A' and the stop as the blind rises and falls on the locking-inclines in closing and opening the blind.

$d$ represents a recess formed in the eye B, to permit the same to pass over the stop $c$ when the eye is so placed that this recess stands in line with the stop.

$e$ represents a tapering extension formed on the pintle above the stop $c$. This extension serves as a temporary support of the eye before the latter engages with the pintle proper, and its tapering form facilitates the engagement of both eyes secured to the same blind, with the pintles secured to the building. The eyes rest on the tapering extension $e$, and can be turned on the same until the recesses $d$ of both eyes are brought in line with the stops $c$ on both pintles, when the blind drops until the eyes rest upon the knuckles A'. The extensions $e$ are preferably constructed in the form of an acorn, as shown in the drawings, or made of some other ornamental shape.

We claim as our invention—

1. In a blind-hinge, a pintle, A, constructed with a tapering extension, $e$, and a stop, $c$, below the extension and projecting laterally beyond the same, substantially as and for the purpose set forth.

2. In a blind-hinge, the combination, with a knuckle, A', and a pintle, A, constructed with a tapering extension, $e$, and a stop, $c$, below said extension and projecting laterally beyond the same, of an eye, B, constructed with a recess, $d$, adapted to rest temporarily on said tapering extension in hanging the blind, and to play on the pintle between the knuckle A' and stop $c$ in opening and closing the blind, substantially as set forth.

CHARLES G. SHEPARD.
PETER ADAMS, JR.

Witnesses:
JNO. J. BONNER,
CHAS. F. GEYER.